March 10, 1959  J. HREBICEK  2,877,011
SPRING SUSPENSION
Filed Feb. 21, 1956  2 Sheets-Sheet 1

INVENTOR.
James Hrebicek
BY
Charles P. Vrytech
Attorney

March 10, 1959 — J. HREBICEK — 2,877,011
SPRING SUSPENSION
Filed Feb. 21, 1956 — 2 Sheets-Sheet 2

INVENTOR.
James Hrebicek
BY
Charles P. Vrtech
Attorney

United States Patent Office 2,877,011
Patented Mar. 10, 1959

2,877,011

SPRING SUSPENSION

James Hrebicek, Chicago, Ill.

Application February 21, 1956, Serial No. 566,942

9 Claims. (Cl. 267—20)

This invention relates to spring suspensions for machinery and particularly to spring suspensions for automotive vehicles.

It is customary to interpose a spring between a vehicle chassis and its supporting wheel to soften and absorb the impact upon the chassis of an irregularity in the road surface. In such constructions one end of the spring is acted upon directly by the wheel or some member movable therewith, and the other end acts directly upon the chassis. This means that there is a direct relationship between the movement of the wheel as it rises and falls and the movement of one end of the spring toward its other end. Thus, if the wheel moves four inches, the spring will be compressed some proportionate amount depending upon the length of the lever arm on which the wheel is mounted and the point of attachment of the spring thereto. Due to the limited space provided for springs in vehicles the spring rate is relatively high so that the great movement of the shock-receiving end of the spring causes a rapid build up of pressure, which is transmitted through the spring to the chassis and is reflected as a rough and uncomfortable ride.

It is an object of this invention to provide a spring suspension for a vehicle wheel or the like wherein the movement of the wheel is substantially dissipated without resulting in a correspondingly large change in length of the spring associated with the vehicle wheel.

As another object this invention seeks to provide a vehicle wheel suspension wherein the reaction force produced in one end of a spring is only slightly altered by relatively large movements of the wheel secured to the other end of the spring.

A more specific object of this invention is the provision of a spring suspension for a vehicle wheel or the like wherein upper and lower springs are provided, with means interposed between the springs for transmitting the load between the springs, said means being of such character as to permit relatively large movement between the upper and lower springs without causing a correspondingly large compression of either of the springs.

These and other objects of this invention will become apparent from the following detailed description when taken together with the accompanying drawings in which, Fig. 1 is a schematic front elevational view of a spring suspension made in accordance with this invention;

Figure 1:
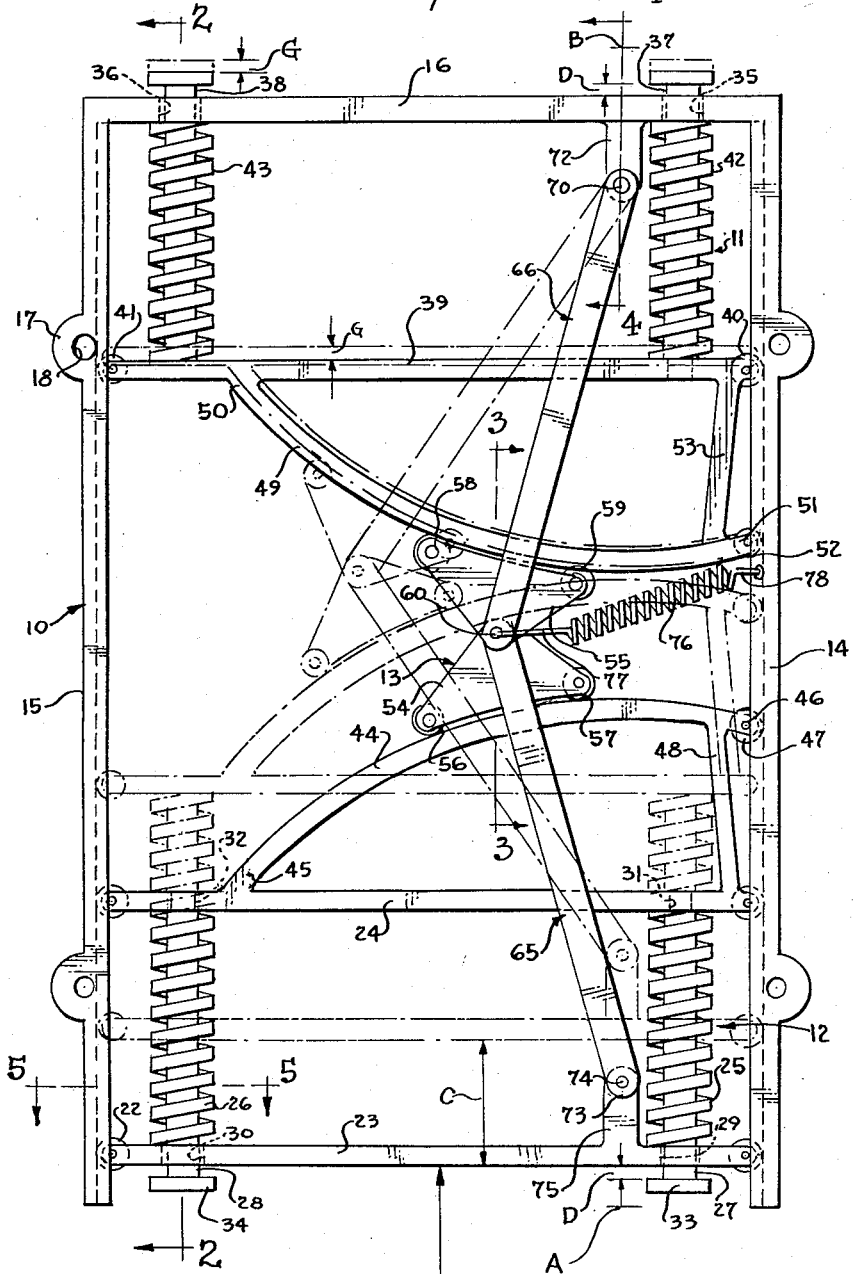
Figure 2:
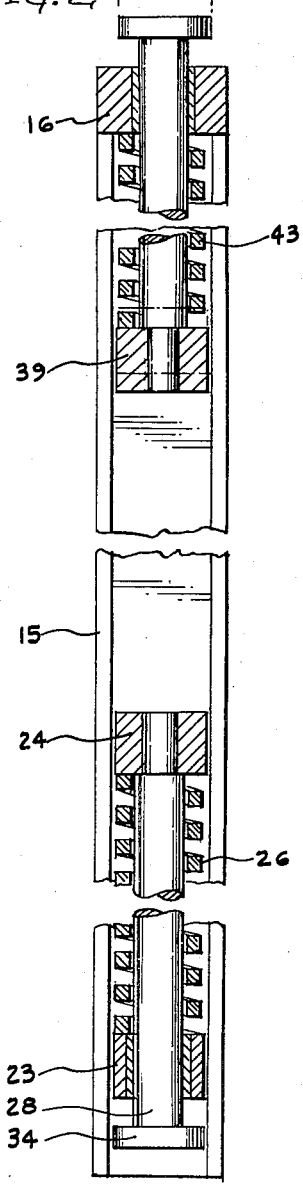
Fig. 2 is a side elevational view taken along the line 2—2 of Fig. 1, the view being somewhat enlarged.

Referring now to Fig. 1, the spring suspension is comprised of an inverted U-shaped frame member 10, a pair of spring units 11 and 12 of substantially identical construction and mounted in opposed relationship to one another, and a transversely slidable carriage 13 connecting the spring units.

Figure 5:
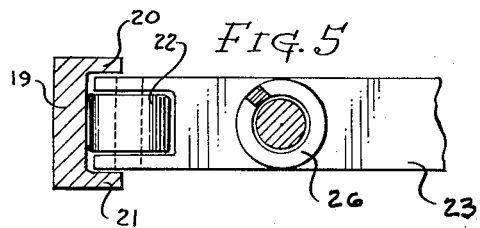
Fig. 5 is a fragmentary plan view in section taken along line 5—5 of Fig. 1, said view being also enlarged.

The U-shaped frame member 10 is comprised of a pair of substantially parallel channel sections 14 and 15 joined at the top by a substantially horizontal bar 16. The channel sections may be provided with ears 17 having openings 18 therein by which the frame member may be secured to the chassis of a vehicle. Other means for attaching the frame to a chassis will suggest themselves to those skilled in the art. The channel sections face inwardly toward one another and, as shown in Fig. 5, are comprised of a relatively thick central web portion 19 and substantially parallel sides 20 and 21 which act as guides for rollers 22 mounted in certain portions of the spring units as hereinafter to be described.

Spring unit 12 is comprised of a pair of spaced, substantially parallel bars 23 and 24 which extend from channel section 14 to channel section 15, and each of which has mounted at the ends thereof the aforesaid rollers 22 so that the bars 23 and 24 may reciprocate toward and away from horizontal bar 16 of the frame member in the channel section.

Bars 23 and 24 are urged apart by a pair of spaced helical springs 25 and 26 each of which is retained in place by pins 27 and 28, respectively, passing through the springs. Bar 23 is provided with openings 29 and 30 through which pins 27 and 28 respectively extend with a relatively loose fit so that axial movement of the pins in said openings will be unimpeded. One end 31 and 32 of each pin is threaded into suitable openings in bar 24, the threaded portion being of smaller diameter than the balance of the pin so that a shoulder is formed in each pin to limit the movement of the pins into their respective threaded openings in bar 24 and thus to secure the pins thereto. The opposite ends of the pins extending through openings 29 and 30 are formed with heads 33 and 34 which act as limit stops for the separation of the bars 23 and 24 under the action of springs 25 and 26.

It is contemplated that springs 25 and 26 will be mounted between bars 23 and 24 with a predetermined initial compression determined by the characteristics of the springs and by the length of the pins 27 and 28.

Spring unit 11 is inverted with respect to unit 12 and may utilize a pair of bars such as bars 23 and 24 of unit 12, but it is preferred that the function of bar 23 will be performed by bar 16 of frame member 10 and, accordingly, said bar 16 is formed with a pair of openings 35, 36 through which extend pins 37, 38 respectively, which may be identical in every respect to pins 27 and 28. The lower ends of the pins 37 and 38 are threaded into a bar 39 which is identical with bar 24 and includes rollers 40 and 41 mounted in the ends thereof and received within the channelled sides 14 and 15 of the frame member for guided movement therein. A pair of helical springs 42 and 43, which may be identical to springs 25 and 26, are mounted between bars 16 and 39 and are retained in place by the passage of pins 37 and 38 through the central portions thereof.

It is contemplated that bar 23 will be secured in any suitable manner to a vehicle wheel support so that said bar 23 will be moved initially upwardly into frame 10 by the reaction F of the weight of the vehicle on the wheel and will be additionally moved upwardly or downwardly depending upon the incidence of irregularities in the path of the wheel.

An arcuate cam track 44 extends upwardly from bar 24 the center of curvature of the track being located substantially at A when the track is in the position shown in Fig. 1. One end 45 of the track may be formed integrally with the upper surface of bar 24 and the opposite end 46 may be provided with a roller 47 which is retained within the sides of the channel section 14 for guided reciprocating movement therein. A suitable thrust member 48 may be provided between bar 24 and the end 46 of track 44 to give the cam track the necessary strength. Other means for providing support for cam track 44 from bar 24 will suggest themselves to those skilled in the art.

Similarly, an arcuate cam track 49, identical in every respect to cam track 44, extends downwardly from the lower surface of bar 39 and has one end 50 formed integrally with the lower surface of the bar 39 and the opposite end 51 provided with a roller 52 which is received between the sides of the channel section 14 for guided reciprocating movement therein. The center of curvature of arcuate track 49, when in the position shown in Fig. 1, is located at B. A thrust member 53 provides the necessary support for end 51 from bar 39.

Between cam tracks 44 and 49 and riding thereon is the carriage 13 which is comprised of similarly shaped followers 54 and 55, each provided with a pair of spaced rollers 56, 57 and 58, 59, rollers 56 and 57 riding on cam track 44 and rollers 58 and 59 riding on cam track 49. Followers 54 and 55 are hinged together by a pin 60 which, as shown more clearly in Fig. 3, passes through spaced ears 61 and 62 on follower 55, and through spaced ears 63, 64 on follower 54.

Movement of carriage 13 along tracks 44 and 49 is controlled by pairs of arms 65 and 66. As shown more clearly in Fig. 3, arms 65 are pivoted at their upper ends about pin 60, and the lower ends of arms 66 are likewise pivoted about pin 60, the said lower ends being provided with offsets 67, 68 to allow arms 66 to overlap arms 65 at pin 60. The upper ends 69 of arms 66 are pivoted upon a pin 70 (Fig. 4), the axis of which is substantially parallel to the axis of pin 60 and which passes through a suitable opening 71 in the lower end of a post 72 which may be formed integrally with bar 16. The lower ends 73 (Fig. 1) of arms 65 are pivoted at 74 to a post 75 extending upwardly from bar 23 and preferably formed integrally therewith.

It may be observed that the axis of pivot 74 does not coincide with point A (the center of curvature of track 44) and hence movement of carriage 13 along track 44 can be accomplished only by forcing said track downwardly relative to bar 23, and this, in turn, can be accomplished only by compressing springs 25 and 26. By making the radius of curvature of track 44 greater than the length of arms 65 from pivot 74 to pin 60, the compressive action upon springs 25 and 26 is brought about by movement of carriage 13 to the left as viewed in Fig. 1. Similarly, the center of curvature B of track 49 does not coincide with the axis of pivot pin 70, and hence movement of carriage 13 along track 49 can be accomplished only by movement of bar 39 toward bar 16 which, in turn can be accomplished only by compression of springs 42 and 43. This, as in the case of unit 12, it also accomplished by movement of carriage 13 to the left as viewed in Fig. 1.

Figure 3:
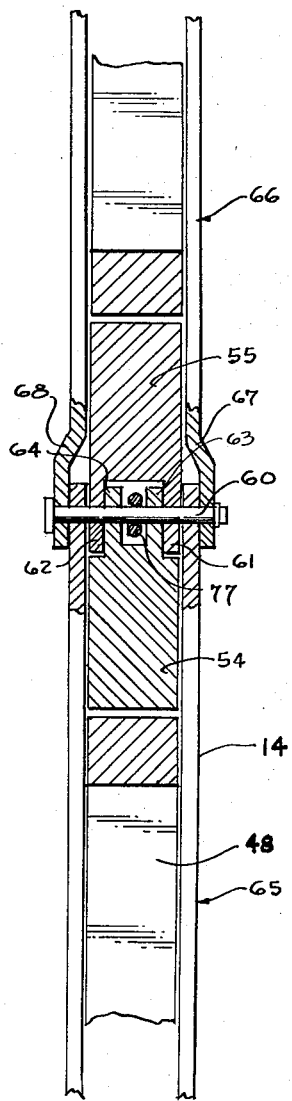
Fig. 3 is a side elevational view in section of a fragment of the spring suspension of Fig. 1, the view being on a scale corresponding to that of Fig. 2 and taken along line 3—3 of Fig. 1 in the direction of the arrows at the end of said line.
Figure 4:
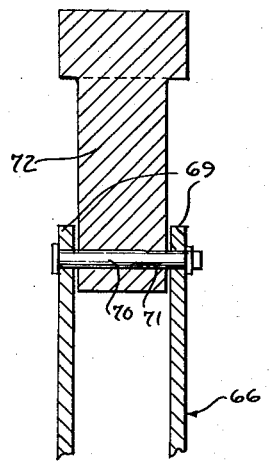
Fig. 4 is an enlarged fragmentary section taken along line 4—4 of Fig. 1 and in the direction of the arrows at the end of said line.

It may be observed from the description thus far given that should a force be applied upwardly upon bar 23 as shown by the arrow marked F in Fig. 1, with frame 10 held against a similar upward movement, bar 23 may move upwardly relative to frame 10, and this upward movement will be transmitted, through springs 25 and 26, to bar 24. Track 44 will then transmit the force through carriage 13 to track 49 and bar 39 and thence, through springs 42 and 43, to bar 16. Due to the generally divergent disposition of the tracks 44 and 49 and to the normal location of carriage 13 on such divergent portions, an upward force on track 44 will result in a movement of carriage 13 to the left as shown in broken lines in Fig. 1 with respect to frame 10. This lateral movement will be resisted by arms 65 and 66 which will permit such lateral movement only upon compression of springs 25, 26 and 42, 43 so that said springs will exert a counteracting force tending to restore carriage 13 to its original position as shown in solid outline in Fig. 1. The return movement of carriage 13 may be assisted by a spring 76 having one end 77 hooked over pin 60 as shown in Fig. 3 and its opposite end 78 secured to channel section 14 of the frame 10.

In operation, assuming that frame 10 is secured to the chassis of a car and that bar 23 is secured in some suitable fashion to a wheel which supports a portion of the car, the weight of the vehicle will cause an initial compression of springs 25, 26 and 42, 43. Thus, heads 33 and 34 of the pins 27, 28 will be spaced from bar 23 by an amount which may be indicated as D in the lower portion of Fig. 1. The heads of pins 37, 38 will likewise be moved a distance D from the upper surface of bar 16. Assuming now that the wheel passes over an obstruction which causes bar 23 to move upwardly a distance C as shown in broken outline in Fig. 1, the pivot 74 will likewise rise an equal amount and the force exerted upon bar 23 will be transmitted through arms 65 to carriage 13 and thence through track 49 to bar 39 and springs 42, 43. Carriage 13 will be compelled to move to the left as viewed in Fig. 1 until the resistance of all of the springs balances the forces acting upon the carriage, which is assumed to be at the broken line position, and track 49 and bar 39 will be moved a distance G to the broken line position shown in Fig. 1.

It may be observed that the net movement G of bar 39 is a small fraction of the movement C of bar 23, and yet during the entire movement of the latter the vehicle was supported by carriage 13 and the springs. The net compression of springs 42, 43 is the same amount G and is shown in the upper left-hand portion of Fig. 1. An analysis of the geometry of the suspension (assuming all components of units 11 and 12 to be alike), would indicate that the compression of springs 25, 26 by virtue of the movement of bar 23 from the solid position to the dotted position in Fig. 1 will likewise be an amount G. Thus, with only a small compression of all of the springs in the suspension a large displacement of the bar 23 will be accommodated. The ability of the wheel to follow more closely irregularities in its path is also greatly enhanced since resistance to movement does not increase as rapidly with the amplitude of the movement as is the case with prior suspension.

It is, of course, possible to so arrange a single spring on a pivoted arm that its change in height will be only a small fraction of the movement of the end of the arm upon which the disturbing force may be impressed. In such single spring arrangements, however, the stiffness of the spring must be increased so that its change in rate for a given change in height is much greater than is the case with the springs of the suspension hereinabove described. This means therefore that the soft feel of springs of the present suspension is little changed regardless of the magnitude of the obstruction the wheels of the vehicle encounter.

It is understood that the embodiment chosen to illustrate this invention is partly schematic and that the relative proportions of the frames, bars and springs may be altered to suit the load requirements of a given application. Similarly, the contours of the tracks 44 and 49 may be altered to provide any desired spring action. It is also understood that the invention is not limited to use in connection with vehicle wheels, but may be employed generally where a rolling device supports a load and is required to traverse an irregular path.

I claim:

1. A spring suspension comprising a load-bearing member, an impulse-receiving member mounted for reciprocating movement toward and away from the load-bearing member, spaced resilient means interposed between the members, means interposed between the resilient means for transmitting force therebetween, said interposed means including two diverging tracks and a carriage slidable on both tracks simultaneously to vary the distance between the resilient means, and means interposed between said members and said carriage for compressing the resilient means as a function of the movement of the carriage along the tracks, whereby to create a resistance to the movement of the carriage along the track.

2. A spring suspension comprising a load-bearing member, an impulse-receiving member mounted for reciprocating movement toward and away from the load-bearing member, spaced resilient means interposed between the members, means in the space between the resilient means for transmitting force therebetween and comprising two spaced curved tracks diverging in a direction transverse to the direction of the force, a carriage adapted to ride on both tracks simultaneously and thereby vary the distance between the resilient means, and means interposed between said member and carriage for forcing the carriage against one of the tracks to compress the resilient means adjacent said track as a function of the movement of the carriage along the track, whereby to create a resistance to the movement of the carriage along the track.

3. A spring suspension as described in claim 2, and including further a rigid member spaced from one of the first-mentioned load receiving or impulse receiving members, said resilient means including a spring compressed between the rigid member and the said one of the first-mentioned members, said rigid member being movable with one of said tracks and the means exerting a force on the carriage comprising a link connecting the carriage with the said one of the first-mentioned members, the point of connection between the link and carriage describing a curve different from that of the track.

4. A spring suspension comprising a load-bearing member, an impulse-receiving member, parallel guides fixed with respect to the load-bearing member, said impulse-receiving member being retained between and slidable along said parallel guides, a first and a second intermediate member retained between and slidable along said parallel guides, spring means in compression between the first intermediate member and the load-bearing member, spring means in compression between the second intermediate member and the impulse-receiving member, means interposed between the first and second intermediate members for transmitting force therebetween, said interposed means including diverging tracks secured to the intermediate members and a carriage slidable on the tracks to vary the distance between the intermediate members, and means for compressing the resilient means interposed between said members and said carriage as a function of the movement of the carriage along the tracks, whereby to create a resistance to the movement of the carriage along the track.

5. A spring suspension as described in claim 4, said carriage including a rigid member, spaced rollers on one side thereof cooperating with one of said tracks and roller means pivotally mounted on the rigid member and cooperating with the other track.

6. A spring suspension as described in claim 4, said means for compressing the resilient means comprising links, a pivot connecting one end of the links with the carriage and pivots connecting the opposite end of the links with the load-bearing and impulse-receiving members, the pivot between the links and carriage describing a curve different from that of the tracks.

7. A spring suspension as described in claim 4, said carriage including a rigid member, spaced rollers on one side thereof cooperating with one of said tracks, roller means pivotally mounted on the rigid member and cooperating with the other track, said means for compressing the resilient means comprising links, a pivot connecting one end of the links with the carriage and pivots connecting the opposite end of the links with the load-bearing and impulse-receiving members, the pivot between the links and carriage describing a curve different from that of the tracks.

8. A spring suspension as described in claim 4, said carriage comprising a pair of pivoted members, one adjacent each track, each member having spaced rollers riding the track adjacent thereto, and the means compressing the resilient means comprising links connecting the pivot-point of the pivoted members with the load-bearing and impulse-receiving members, the links pivoting about points on the last-mentioned members which are different from the centers of curvature of the curved tracks.

9. A spring suspension as described in claim 4, said spring means comprising helical springs, and pins passing through said springs, said pins passing through the load-bearing and impulse-receiving members with a sliding fit and being secured to the intermediate members, and stop means on the pins for limiting movement of the load-bearing and impulse-receiving members relative to the intermediate members.

References Cited in the file of this patent

UNITED STATES PATENTS

| | | |
|---|---|---|
| 1,243,964 | Boswell | Oct. 23, 1917 |
| 2,639,140 | Frenkel | May 19, 1953 |

FOREIGN PATENTS

| | | |
|---|---|---|
| 183,500 | Great Britain | Aug. 1, 1922 |